United States Patent [19]
Lai et al.

[11] Patent Number: 5,637,266
[45] Date of Patent: Jun. 10, 1997

[54] METHOD FOR FORMING CHROMIUM CARBIDE BASED CERAMICS COMPOSITE BLOCK GAUGE

[75] Inventors: Chung-Ping Lai; Cheng-Tsu Fu; Jia-Ruey Duann; Ai-Kang Li; Kai-Li Ko, all of Hsinchu, Taiwan

[73] Assignee: Industrial Technology Research Institute, Hsinchu, Taiwan

[21] Appl. No.: 492,907

[22] Filed: Jun. 20, 1995

Related U.S. Application Data

[62] Division of Ser. No. 405,832, Mar. 17, 1995, Pat. No. 5,470,807.

[51] Int. Cl.$^6$ ..................................................... B22F 1/00
[52] U.S. Cl. .......................... 264/676; 264/122; 264/678; 501/93
[58] Field of Search ................................ 264/60, 66, 67, 264/122; 501/93

[56] References Cited

U.S. PATENT DOCUMENTS

| | | | |
|---|---|---|---|
| 4,886,638 | 12/1989 | Penkunas et al. | 419/15 |
| 5,108,963 | 4/1992 | Fu et al. | 501/89 |
| 5,443,770 | 8/1995 | Krstic et al. | 264/60 |
| 5,470,807 | 11/1995 | Lai et al. | 501/93 |
| 5,482,670 | 1/1996 | Hong | 419/15 |

*Primary Examiner*—Christopher A. Fiorilla
*Attorney, Agent, or Firm*—Bacon & Thomas

[57] ABSTRACT

A composite ceramic block gauge is formed from a tungsten carbide (WC) reinforced phase and a chromium carbide ($Cr_3C_2$) matrix. The finished block gauge possesses excellent properties such as hardness and corrosion resistance and high reflectivity. The block gauges made from $Cr_3C_2$/WC composites can be calibrated using the traditional optical interferometry techniques.

10 Claims, 1 Drawing Sheet

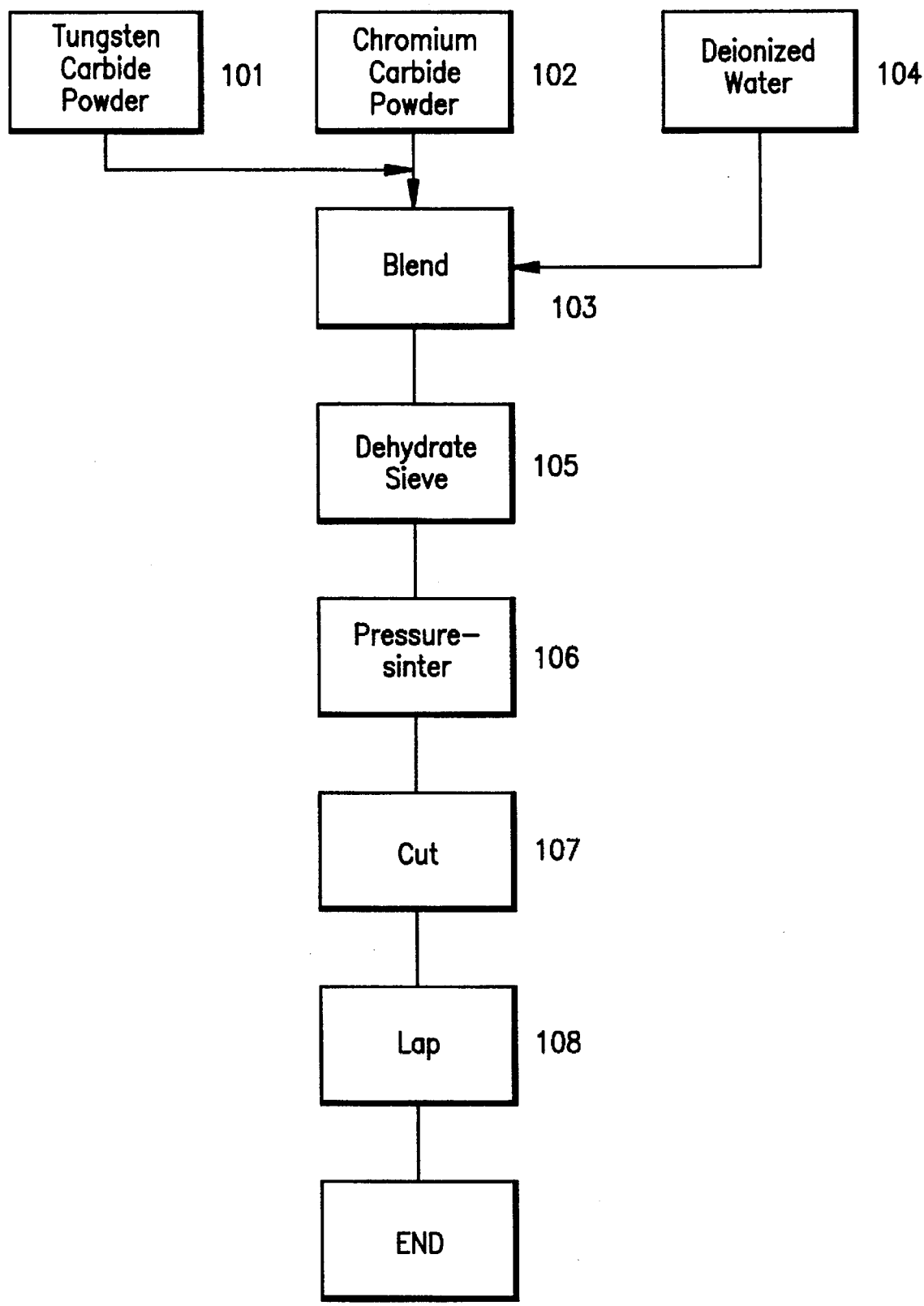

METHOD FOR FORMING CHROMIUM CARBIDE BASED CERAMICS COMPOSITE BLOCK GAUGE

This application is a division of application Ser. No. 08/405,832, filed Mar. 17, 1995, now U.S. Pat. No. 5,470,807.

FIELD OF THE INVENTION

The present invention relates to a ceramics composite block gauge and a method of preparation of the block gauge, especially to a chromium carbide based ceramics composite block gauge. The composite block gauge of this invention may be used as a reference gauge in precise measurement of dimension.

PRIOR ART

The standard block gauge is a useful and popular calibration tool in the industry and the research institutes, for the measurement of dimension. The conventional block gauges are usually manufactured with metals as starting materials. These block gauges, however, inherent the following disadvantages such as insufficient corrosion resistance and limited abrasion resistance. For these reasons, the handling as well as storage of these gauges requires considerable cares and extensive amount of labors. For example, they can not be handled by bare hand in fear of finger-print rust. Furthermore, they must be stored in a corrosion-free environment such as a humidity controlled cabinet, and must be preserved in rust-preventive oil. Upon usage, the oil must be removed following several tedious procedures. In these oil-removing steps, considerable care must be taken if dust was accidentally involved which will result in the abrasion of the gauge surfaces.

If any of the above-mentioned damage happens, the surface of the metal gauge are impaired. Thereby, these gauges can no longer be wrung with other block gauges or interferometry base plates, not even to be used to precisely indicate the dimension.

Block gauges may be made from ceramics materials. Reference may be made to U.S. Pat. No. 5,272,120 and Japan Patent No. 63188701. As ceramic block gauges are concerned, the commercially available block gauges are made from conventional ceramics such as zirconium, alumina, silicon carbide, tungsten carbide or silicon nitrite. Although these ceramic gauge materials possess a few excellent properties over that of metals, they can not, however, be measured or calibrated via prevailing optical measuring tools such as block gauge dimensional interferometer simply because of the insufficiency in the optical reflectivity.

Table I shows the surface optical reflectivity of several ceramics block gauges. As shown in the table, only an exceptional ceramic block gauge made from monolithic chromium carbide possesses excellent optical property. However, this type of gauges does not possess satisfactory properties in flexure strength and fracture toughness, and, as a consequence, the reliability of the block gauges made by this material is less than expected.

To overcome the shortages of ceramic block gauges, some suggested adding metal sintering aid such as cobalt, nickel or chromium into carbides based materials (such as chromium carbide or tungsten carbide) to prepare ceramic block gauges. It is, however, found that, due to the metal sintering aid the hardness, abrasion resistance and corrosion resistance of the block gauge is decreased. Also the lifetime of the block gauge is shortened.

It is thus an urgent need in the industry to have a novel block gauge which possesses the hardness, corrosion and abrasion resistance, of ceramics, and the optical reflectivity of metal materials.

OBJECTS OF THE INVENTION

The object of the present invention is to provide a novel block gauge which possesses the hardness, corrosion and abrasion resistance of ceramic materials and the optical reflectivity resembling that of metallic block gauges.

Another object of the present invention is to provide a novel ceramics block gauge which may be measured or calibrated via prevailing optical measuring tools such as a block gauge dimension interferometer.

Another object of the present invention is to provide a new composite material suited for the preparation of block gauges.

Another object of the invention is to provide a method of the preparation of chromium carbide based ceramics block gauge.

SUMMARY OF THE INVENTION

According to the present invention a chromium carbide based ceramics block gauge is provided. The ceramics block gauge of this invention comprises ceramic composite material based on the chromium carbide matrix reinforced by tungsten carbide was disclosed. The invented ceramic material is prepared via a pressure sintering process with chromium carbide as a main ingredient and 5 to 35 vol. % of tungsten carbide as a reinforcement. This ceramic composite was chosen because it possesses several inherent excellent properties over other materials, including (1) sufficient corrosion-resistance, (2) remarkable hardness, (3) outstanding flexure strength and toughness, (4) thermal expansion coefficient substantially equal to that of steel, which is generally an object of measurement, (5) dense and homogeneous structure, and (6), especially, high optical reflectivity and surface lustrousness which are considerably over that of ceramic gauge materials and close to that of a conventional metallic gauge material.

These and other objects and advantages of the present invention may be clearly understood from the description of the invention by referring to the following drawings.

BRIEF DESCRIPTION OF THE DRAWINGS

IN THE DRAWINGS,

FIG. 1 is a flow chart of the preparation method for chromium carbide based ceramics composite block gauge of this invention.

Table I shows the surface optical reflectivity of block gauges made from several ceramics materials.

Table II shows the physical properties of the composite ceramics block gauges of this invention.

DESCRIPTION OF THE PREFERRED EMBODIMENT

The present invention will be described and explained in detail with reference to the following embodiments.

FIG. 1 shows the flow chart of the preparation method for chromium carbide based ceramics composite block gauges of this invention. As shown in the figure, at 101 5 to 35 vol.% of tungsten carbide powder is prepared and at 102 the balance of chromium carbide powder is prepared. At 103 the both materials are blended. The starting powder diameter is about 0.2 to 10 μm.

At 104 the blended composition is added to deionized water. The mixture is blended for 24 hours to obtain a homogeneous slurry. At 105 the mixture is dehydrated, sieved and preliminary pressure molded. At 106 the green compact is placed inside a graphite mold and pressure-sintered at 1,400° to 1,700° for 1 to 4 hours. The pressure is maintained at about 30 MPa, and a reducing (argon or nitrogen) atmosphere or vacuum is maintained during the sintering process. After sintering, at 107 the sintered products with predictable shrinkage size closer to the predetermined width are cut using a diamond wheel into rectangular parallelopiped with a few microns slightly larger than the predetermined dimension. The trimmed parallelopiped composite was, then, lapped using commercial abrasives such as diamond into predetermined flatness and desired parallelism at 108.

The sintered body obtained from the above-described process contains tungsten carbide particles which are uniformly distributed in the chromium carbide matrix without the help of any metallic sintering aid. The tungsten carbide reinforced chromium carbide matrix, hereinafter referred to as "chromium carbide/tungsten carbide composite", retains all the desired chemical and mechanical properties as well as the optical properties of the chromium carbide material. The invented composite ceramics block gauge so prepared possesses improved flexure strength and fracture toughness out of the conventional art.

Although the invention is not limited by any theory, the improved hardness comparative to the monolithic chromium carbide is owing to the substantially higher elastic modulus of the pure tungsten carbide phase, which is about 710 GPa, in comparison to 385 GPa of the chromium carbide phase. Furthermore, the increased strength and toughness are due to the thermal expansion coefficient difference between the tungsten carbide ($\alpha=6.9\times10^{-6}$/°C.) and chromium carbide ($\alpha=11.2\times10^{-6}$/°C.). During the post-sintering annealing stage, a residual stress will remain at the interface between these two components. Such residual stress causes the preference of a crystal fracture mode, changing from the predominantly intergranular mode to a transgranular mode. This switch of modes results in a significant increase in the fracture strength of the composite material.

Besides, tungsten carbide particles are also observed to cause a crack-bridging effect. This effect further increases the fracture toughness of the composite material used in the present invention.

Thermal expansion coefficient of the tungsten carbide/chromium carbide composite block gauge can be finely adjusted via a variation of the amount of tungsten carbide additive. Thermal expansion coefficient of the tungsten carbide/chromium carbide ceramic composites can vary from $11.2\times10^{-6}$/°C. of a pure chromium bulk, virtually free of any additive, to about $9.5\times10^{-6}$/°C., with 20 vol. % tungsten carbide reinforcement. Further addition of tungsten carbide to lower the thermal expansion coefficient is feasible when special applications are needed. On the other hand, the thermal expansion of general tooling steel to be measured (referring to table II) is within the range between $9\sim15\times10^{-6}$/°C. Thanks to the resemblance of the thermal expansion behavior of the invented gauge block with that of the tooling steel, large measurement error due to the variation of temperature in the working environment may be avoided.

Still, the block gauge of the present invention possesses a superior surface lustrousness and an optical reflectivity over conventional ceramic block gauges as indicated in Table I. As the optical reflectivity is a parameter determined by the ratio of the absorption coefficient and the scattering coefficient and the scattering factor is, in turn, dependent upon the relative refractive index as well as the particle size of the inclusions within a bulk, it is, therefore, concluded that the high reflectivity of the block gauge of the present invention is mainly resulted from a combination of material properties. This unique high reflectivity enables the measurement or calibration of block gauges via prevailing optical interferometry methods. This solves the most prominent deficit of the conventional ceramic block gauges.

The forgoing description of the preferred embodiments of this invention is chosen and presented for the purposes of illustration and description. It is evident that various modifications may be made thereto in light of the above instructions which are not specifically described above but which are clearly within the scope and spirit of the present invention. It is therefore intended that all the modifications and variations fall within the scope and spirit of the present invention as determined by the appended claims when interpreted in accordance with the breadth to which they are fairly, legally, and equitably entitled.

TABLE I

| | Temp. (°C.) | WC Vol. % (%) | Sintering Time (Hrs.) | Reflectivity at 45° (%) | | Reflectivity at 90° (%) | |
|---|---|---|---|---|---|---|---|
| 1 | 1400 | 14 | 1 | 39 | 38.3 | 38 | 37.7 |
| | | | | 38 | | 38 | |
| | | | | 38 | | 37 | |
| 2 | 1400 | 14 | 2 | 39 | 38.7 | 47 | 46 |
| | | | | 38 | | 44 | |
| | | | | 39 | | 47 | |
| 3 | 1400 | 14 | 4 | 39 | 39.7 | 40 | 43 |
| | | | | 40 | | 44 | |
| | | | | 40 | | 45 | |
| 4 | 1500 | 25 | 1 | 38 | 38 | 45 | 45 |
| | | | | 38 | | 44 | |
| | | | | 38 | | 46 | |
| 5 | 1550 | 25 | 1 | 41 | 41 | 55 | 55 |
| | | | | 41 | | 52 | |
| | | | | 41 | | 58 | |
| 6 | 1600 | 25 | 1 | 40 | 40 | 47 | 48 |
| | | | | 40 | | 49 | |
| | | | | 40 | | 48 | |
| 7 | 1600 | 20 | 1 | 44 | 43.7 | 51 | 51 |
| | | | | 44 | | 51 | |
| | | | | 43 | | 51 | |
| 8 | 1500 | 0 | 1 | 46 | 46.7 | 58 | 58 |
| | | | | 47 | | 58 | |
| | | | | 47 | 58 | | |
| 9 | 1600 | 0 | 1 | 47 | 47.7 | 56 | 55 |
| | | | | 48 | | 54 | |
| | | | | 48 | | 55 | |
| 10 | 1550 | $Al_2O_3$ | 1 | 2.7 | 2.4 | 5.1 | 5.3 |
| | | | | 2.3 | | 5.4 | |
| | | | | 2.1 | | 5.4 | |
| 11 | 1600 | $ZrO_2$ | 2 | 6.4 | 6.4 | 12.9 | 12.5 |
| | | | | 6.4 | | 12.1 | |
| | | | | 6.5 | | 12.5 | |
| 12 | | $Si_3N_4$ | | 4.1 | 4.1 | 5.5 | 5.2 |
| | | | | 4.1 | | 5.0 | |
| | | | | 4.1 | | 5.1 | |
| 13 | | SiC | | 9.7 | 9.3 | 14.1 | 14.1 |
| | | | | 9.0 | | 13.8 | |
| | | | | 9.3 | | 14.4 | |
| 14 | | PTW S.S | | 49 | 48 | 60 | 59.7 |
| | Gauge block | | | 48 | | 60 | |
| | | | | 47 | | 59 | |

P.T.W. stands for "Precision Tsugami Works" where "Tsugami" is a trade mark of a Japanese firm

TABLE II

Thermal expansion coefficients of some typical tooling steel

| Material | Thermal expansion coefficient ($\times 10^{-6}/°C$.) | Material | Thermal expansion coefficient ($\times 10^{-6}/°C$.) |
|---|---|---|---|
| Steel | 11.7 | Chromium iron (0.009–0.25% C, 0.55–1.5% Cr) | 11.2 |
| Hard steel (0,4–1.60% C) | 10.7 | Ni—Cr iron (0.25–0.55 % C, 1–5% Ni, 0.3–2% Cr) | 13.3 |
| High carbon steel (0.8–1,6% C) | 9.6–10.9 | Manganese iron (0.4–0.6% C, 0.7–2% Mn) | 13.2 |
| Stainless steel (SUS 24 B) | 10.4 | Molybdenum iron (0.15–0.4% C, ~1% Mo) | 14.0 |
| Stainless steel (SUS 51 B) | 11.0 | Tool steel (0.4–1.0% C, 3–6% Cr, 14–2% W. 0–2% V. 0–1.3% Co) | 10.7 |

What is claimed is:

1. A method for the preparation of a composite ceramic based block gauge comprising: blending in a mixture of 5 to 35 vol. % tungsten carbide powder and 70 to 95% by volume of chromium carbide;

adding de-ionized water to the mixture so obtained;

blending said mixture to obtain a homogeneous slurry;

drying and preliminary pressure molding of said slurry into a solid composition;

heating and sintering of the solid composition; wherein said sintering process is conducted in a controlled low-oxygen environment, under pressure and elevated temperature and said low oxygen environment is an inert gas environment or a vacuum environment, wherein said inert gas environment is an environment back-filled from vacuum with inert gas comprising at least one gas selected from the group consisting of nitrogen, helium and argon; and trimming said composition to a desired dimension.

2. The method of claim 1 wherein said pressure is equal to or no greater than one atmospheric pressure.

3. The method of claim 1 wherein said sintering pressure is between 5 and 50 MPa.

4. The method of claim 3 wherein said sintering pressure is between 25 and 40 MPa.

5. The method of claim 1 wherein said sintering temperature is between 1,400° and 1,800° C.

6. A method for the preparation of a composite ceramic based block gauge comprising:

blending in a mixture of 5 to 30 vol. % tungsten carbide powder and 70 to 95% by volume of chromium carbide;

adding de-ionized water to the mixture so obtained;

blending said mixture to obtain a homogeneous slurry;

drying and preliminary pressure molding of said slurry into a solid composition;

heating and sintering of the solid composition; wherein said sintering process is conducted in a controlled low-oxygen environment, under pressure and elevated temperature and said low oxygen environment is an inert gas environment or a vacuum environment, wherein said inert gas environment is an environment back-filled from vacuum with inert gas comprising at least one gas selected from the group consisting of nitrogen, helium and argon; and trimming said composition to a desired dimension.

7. The method of claim 6 wherein said pressure is equal to or no greater than one atmospheric pressure.

8. The method of claim 7 wherein said sintering pressure is between 5 and 50 MPa.

9. The method of claim 8 wherein said sintering pressure is between 25 and 40 MPa.

10. The method of claim 6 wherein said sintering temperature is between 1,400° and 1,800° C.

* * * * *